United States Patent Office 2,864,517
Patented Dec. 16, 1958

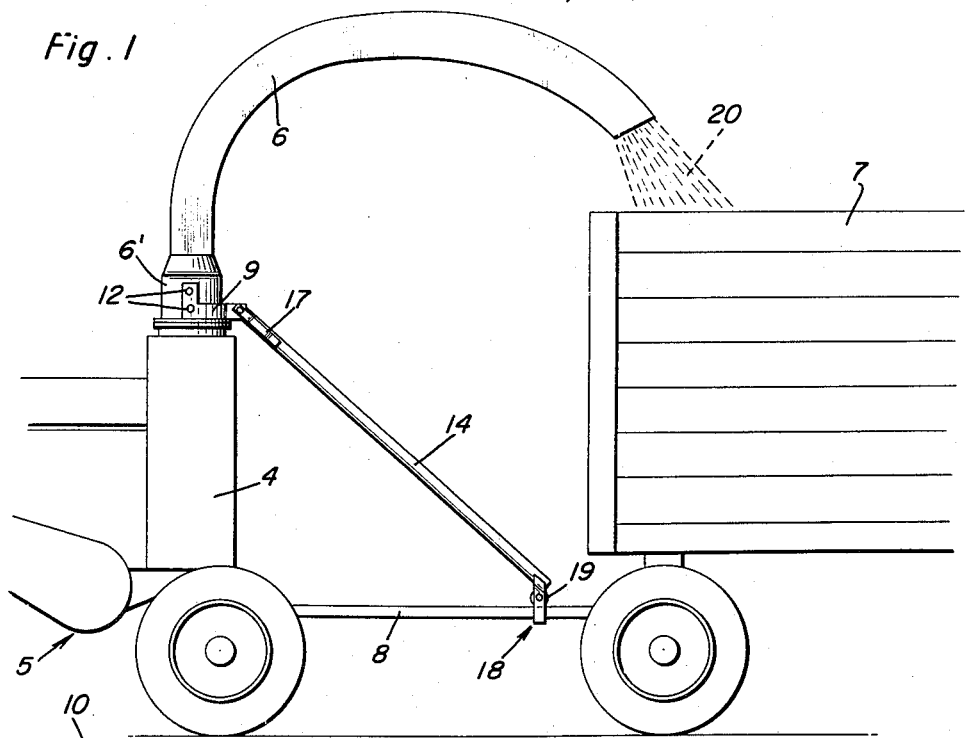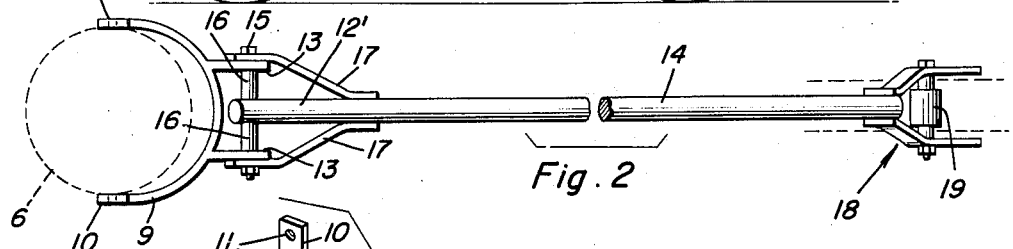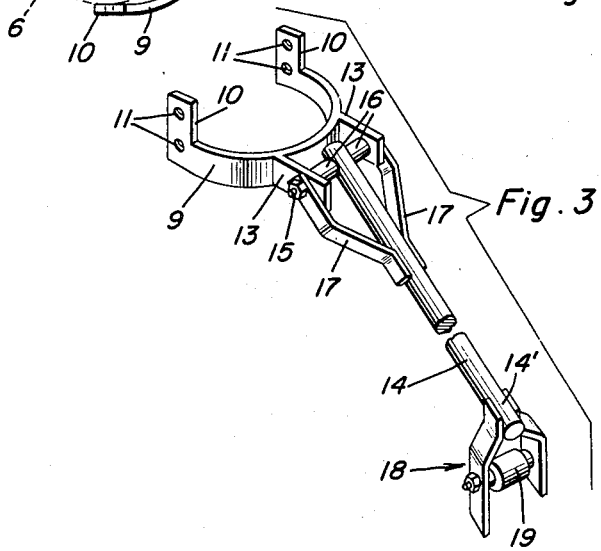

2,864,517

SILAGE HARVESTER DISCHARGE SPOUT LOCATOR

Charles F. Dickenshied, Jr., Zionsville, Pa.

Application February 8, 1957, Serial No. 639,167

1 Claim. (Cl. 214—42)

This invention relates to new and useful improvements in locators particularly for the swivelled discharge spouts or chutes of alfalfa, etc., harvesters, wherein the silage is blown from a chopper into a trailing wagon drawn by the harvester.

The primary object of the present invention is to provide, in a manner as hereinafter set forth, novel means, operable by the wagon tongue, for keeping the outlet end of the discharge spout or chute correctly positioned over the wagon at all times regardless of any angularity which the harvester may assume relative to said wagon, as when turning.

Another important object of the invention is to provide a chopper discharge spout or chute locator of the aforementioned character which may be expeditiously mounted for operation on conventional choppers without necessity of making material structural alterations therein.

Still another important object of the invention is to provide a discharge spout or chute locator of the character described which may readily be rendered inoperative when desired and which, further, will interfere in no way with the hitching or unhitching of the wagon.

Other objects of the invention are to provide a spout or chute locator of the aforementioned character which will be comparatively simple in construction, strong, durable, highly efficient and reliable in use, compact, of light weight and which may be manufactured and installed at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a view in side elevation, showing a discharge spout or chute locator embodying the present invention installed;

Figure 2 is an enlarged top plan view of the device; and

Figure 3 is an enlarged perspective view thereof.

Referring now to the drawing in detail, it will be seen that reference character 4 designates a portion of the conventional chopper mounted on a silage harvester 5, said chopper including the usual swivelled pneumatic discharge spout or chute 6 through which the silage is blown into a trailing wagon 7 detachably connected by a tongue 8 to said harvester 5.

The embodiment of the present invention which has been illustrated comprises a yoke 9 of suitable metal which is mounted horizontally on the swivelled end portion 6' of the spout 6 in a manner to straddle and extend rearwardly therefrom. The yoke 9 includes upturned end portions 10 which are apertured, as at 11, to accommodate securing bolts 12 for attaching the yoke 9 to said portion 6'. Projecting rearwardly from the yoke 9 is a pair of laterally spaced, opposed, apertured ears 13.

Pivotally mounted for swinging movement in a vertical plane between the ears 13 is an arm or lever 14. A bolt 15 pivotally and detachably secures one end portion 12' of the lever 14 between the ears 13. Spacers 16 are provided on the bolt 15 on opposite sides of the end portion 12' of the lever 14. The lever 14 is further provided with lateral braces 17 on opposite sides of its pivoted end portion 12' straddling the pair of ears 13 and, which braces swing on the bolt 15.

The other or free end portion 14' of the lever 14 is provided with an angularly downwardly extending fork 18 which straddles the trailer wagon tongue 8. Mounted horizontally in the fork 18 is a roller 19 which is operable on the tongue 8. Thus, the lever 14 is connected to the tongue 8 for actuation thereby.

It is thought that the operation of the device will be readily apparent from a consideration of the foregoing. Briefly, the free end portion 14' of the lever 14 rests by gravity on the tongue 8, the fork 18 straddling said tongue with the roller 19 operable thereon. With the harvester 5 and the wagon 7 aligned, the spout 6 is centered as usual over said wagon for discharging the silage thereinto, as indicated at 20. Of course, the tongue 8 is pivotally and detachably connected to the harvester 5. Should the harvester 5 turn either to the right or the left, the lever 14, having its free end connected to the tongue 8, turns the swivelly mounted spout 5 in an obvious manner for keeping the outlet or free end thereof correctly positioned over the wagon 7. The pivotal mounting of the lever 14 on the yoke 9 permits relative vertical movement between the harvester 5 and the wagon 7, as when travelling over irregularities. The construction and arrangement of parts, it will be noted, is such that the device may be readily disconnected from the trailer tongue 8, when desired. Also, the lever 14 may be disconnected from the yoke 9 by removing the bolt 15.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A spout locator comprising a horizontal yoke adapted to straddle a swiveled end portion of a silage discharge spout of a silage chopper and having upturned ends attachable to said end portion of the spout, a pair of laterally spaced opposed ears extending from said yoke, a lever having one end portion pivoted between said ears for vertical swinging of the lever and having a free end portion, a pair of braces on the pivoted end portion of said lever at opposite sides thereof straddling said pair of ears and pivoted thereto by the pivot of said one end portion, a downwardly extending fork on the free end of the lever adapted to straddle a vertically movable steering tongue of a wagon connected to a silage chopper having the swiveled end portion of the spout swiveled thereon, and a roller in said fork adapted to roll on the tongue.

References Cited in the file of this patent

UNITED STATES PATENTS

| | | |
|---|---|---|
| 2,496,472 | Huddle | Feb. 7, 1950 |
| 2,778,510 | Mayhill et al. | Jan. 22, 1957 |
| 2,789,705 | Eberly | Apr. 23, 1957 |